United States Patent
Oono et al.

(10) Patent No.: US 11,171,321 B2
(45) Date of Patent: Nov. 9, 2021

(54) ELECTRODE MATERIAL AND METHOD FOR MANUFACTURING THE SAME

(71) Applicant: SUMITOMO OSAKA CEMENT CO., LTD., Tokyo (JP)

(72) Inventors: Kouji Oono, Chiba (JP); Takao Kitagawa, Chiba (JP); Tetsuya Nakabeppu, Chiba (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/282,700

(22) Filed: Feb. 22, 2019

(65) Prior Publication Data

US 2019/0386290 A1  Dec. 19, 2019

(30) Foreign Application Priority Data

Jun. 13, 2018 (JP) .............................. JP2018-112818

(51) Int. Cl.
| | |
|---|---|
| *H01M 4/131* | (2010.01) |
| *H01M 4/04* | (2006.01) |
| *H01M 4/505* | (2010.01) |
| *H01M 4/525* | (2010.01) |

(52) U.S. Cl.
CPC ......... *H01M 4/131* (2013.01); *H01M 4/0471* (2013.01); *H01M 4/505* (2013.01); *H01M 4/525* (2013.01)

(58) Field of Classification Search
CPC ...... H01M 4/131; H01M 4/505; H01M 4/525; H01M 4/04; H01M 4/0471; H01M 4/133; H01M 4/625; H01M 4/366; H01M 4/485; H01M 4/628; H01M 10/0525; Y02E 60/10

See application file for complete search history.

(56) References Cited

U.S. PATENT DOCUMENTS

| | | | | |
|---|---|---|---|---|
| 2010/0119956 A1* | 5/2010 | Tokuda | ............... | H01M 10/052 |
| | | | | 429/338 |
| 2013/0140497 A1 | 6/2013 | Nuspl et al. | | |
| 2013/0295463 A1* | 11/2013 | Matsuda | ............ | H01M 4/0471 |
| | | | | 429/231.8 |
| 2015/0255787 A1 | 9/2015 | Mine et al. | | |
| 2015/0325846 A1* | 11/2015 | Kitagawa | .............. | H01M 4/625 |
| | | | | 429/217 |
| 2017/0092933 A1 | 3/2017 | Oshitari et al. | | |

FOREIGN PATENT DOCUMENTS

| | | | | |
|---|---|---|---|---|
| CN | 103038162 | | 4/2013 | |
| CN | 105210216 | | 12/2015 | |
| CN | 106252658 | | 12/2016 | |
| EP | 2562857 A2 | | 2/2013 | |
| EP | 2641867 A1 | | 9/2013 | |
| JP | H11-273676 | | 10/1999 | |
| JP | 2000-357523 | * | 12/2000 | ............. H01M 4/96 |
| JP | 2001-015111 | | 1/2001 | |
| JP | 2013-514606 | | 4/2013 | |
| JP | 2013-157260 | | 8/2013 | |
| JP | 2013-161654 | | 8/2013 | |
| JP | 2016-157684 | | 9/2016 | |
| WO | 2012/039477 | | 3/2012 | |

OTHER PUBLICATIONS

European Search Report, European patent Office, Application No. 19158028.1, dated Sep. 19, 2019, 5 pages.

* cited by examiner

*Primary Examiner* — Matthew T Martin

(74) *Attorney, Agent, or Firm* — Greenblum & Bernstein, P.L.C.

(57) ABSTRACT

An electrode material having an electrode active material and a pyrolytic carbonaceous electron-conducting film that coats a surface of the electrode active material, in which an amount of a surface acid of the electrode material, which is determined by a back-titration method using tetrabutylammonium hydroxide, is 1 $\mu mol/m^2$ or more and 5 $\mu mol/m^2$ or less per surface area of the electrode material.

4 Claims, No Drawings

ELECTRODE MATERIAL AND METHOD FOR MANUFACTURING THE SAME

CROSS-REFERENCE TO RELATED APPLICATIONS

This application claims the benefit of Japanese Patent Application No. 2018-112818 filed Jun. 13, 2018, the disclosure of which is herein incorporated by reference in its entirety.

BACKGROUND OF THE INVENTION

Field of the Invention

The present invention relates to an electrode material and a method for manufacturing the same.

Description of Related Art

In recent years, as small-size, lightweight, and high-capacity batteries, non-aqueous electrolyte-based secondary batteries such as lithium ion batteries have been proposed and put into practical use. These lithium ion batteries are constituted of a cathode and an anode which have properties capable of reversibly intercalating and deintercalating lithium ions and a non-aqueous electrolyte.

Lithium ion batteries weigh less and have a smaller size and a higher energy than secondary batteries of the related art such as lead batteries, nickel-cadmium rechargeable batteries, and nickel metal hydride rechargeable batteries, are used as power supplies for mobile electronic devices such as mobile phones and notebook-type personal computers, and, in recent years, also have been studied as high-output power supplies for electric vehicles, hybrid vehicles, and electric tools. Electrode active materials for batteries that are used as the above-described high-output power supplies are required to have high-speed charge and discharge characteristics. In addition, studies are also made to apply the electrode active materials for the smoothing of power generation loads or to large-scale batteries such as stationary power supplies and backup power supplies, and the absence of problems regarding resource amounts as well as long-term safety and reliability is also considered to be important.

Cathodes in lithium ion batteries are constituted of an electrode material including a Li-containing metal oxide having properties capable of reversibly intercalating and deintercalating lithium ions which is called a cathode active material, a conductive auxiliary agent, and a binder, and this electrode material is applied onto the surface of a metallic foil which is called a current collector, thereby producing cathodes. As the cathode active material for lithium ion batteries, generally, lithium cobalt oxide ($LiCoO_2$) is used, and, additionally, lithium (Li) compounds such as lithium nickel oxide ($LiNiO_2$), lithium manganese oxide ($LiMn_2O_4$), and lithium iron phosphate ($LiFePO_4$) are used. Among these, lithium cobalt oxide or lithium nickel oxide has a problem of the toxicity or resource amounts of elements and a problem such as instability in charged states. In addition, lithium manganese oxide is pointed out to have a problem of being dissolved in electrolytes at high temperatures, and phosphate-based electrode materials which are excellent in terms of long-term safety and reliability, are represented by lithium iron phosphate, and have an olivine structure have been attracting attention in recent years (for example, refer to Japanese Laid-open Patent Publication No. 2013-161654).

The phosphate-based electrode materials have insufficient electron conductivity and thus, in order to charge and discharge large electric currents, a variety of means such as the miniaturization of particles and the conjugation with conductive substances is required, and a lot of efforts are being made. However, conjugation using a large amount of a conductive substance causes a decrease in electrode densities, and thus a decrease in the density of batteries, that is, a decrease in capacities per unit volume is caused. As a method for solving this problem, a pyrolytic carbon coating method using an organic substance solution as a carbon precursor which is an electron conductive substance has been found (for example, Japanese Laid-open Patent Publication No. 2001-015111). In the present method in which the organic substance solution and electrode active material particles are mixed together, then dried, and thermally treated in a non-oxidative atmosphere, thereby carbonizing an organic substance, it is possible to extremely efficiently coat the surfaces of the electrode active material particles with a minimum necessary amount of the electron conductive substance, and conductivity can be improved without significantly decreasing electrode densities.

SUMMARY OF THE INVENTION

However, the surfaces of cathode materials that are obtained in the present method are formed of a carbonaceous material, and thus the wettability with electrolytes is not sufficient. Therefore, barriers to the intercalation and deintercalation of Li ions in the interfaces between electrolytes and cathode materials are large, and obstacles to an increase in output are caused. Particularly, in inorganic solid electrolytes or polymer solid electrolytes that have been recently attracting attention from the viewpoint of safety or cycle service lives, peeling in solid-solid interfaces caused by a change in volume during charging and discharging easily occurs, and the influence of the insufficient wettability is particularly large.

The present invention has been made in consideration of the above-described circumstances, and an object of the present invention is to provide an electrode material enabling the obtainment of lithium ion batteries which are excellent in terms of cycle characteristics and input and output characteristics and capable of suppressing cell swelling and a method for manufacturing the electrode material.

The present inventors and the like carried out intensive studies in order to solve the above-described problem and consequently found that, when the amount of a surface acid of an electrode material including an electrode active material coated with a pyrolytic carbonaceous electron-conducting film, which is determined by a back-titration method using tetrabutylammonium hydroxide, is set in a specific range, the above-described problem is solved. The present invention has been completed on the basis of the above-described finding.

That is, the present disclosure relates to the following.

[1] An electrode material including an electrode active material and a pyrolytic carbonaceous electron-conducting film that coats a surface of the electrode active material, in which an amount of a surface acid of the electrode material, which is determined by a back-titration method using tetrabutylammonium hydroxide, is 1 $\mu mol/m^2$ or more and 5 $\mu mol/m^2$ or less per surface area of the electrode material.

[2] The electrode material according to [1], in which the electrode active material is an electrode active material substance represented by General Formula of $Li_aA_xBO_4$ (here, A represents at least one element selected from the group consisting of Mn, Fe, Co, and Ni, B represents at least one element selected from the group consisting of P, Si, and S, and $0 \leq a < 4$ and $0 < x < 1.5$ are satisfied).

[3] A method for manufacturing the electrode material according to [1] or [2], the method including a step (A) of obtaining an electrode active material, a step (B) of mixing an organic compound that serves as a pyrolytic carbonaceous electron-conducting film source into the electrode active material obtained in the step (A) to obtain a granulated substance, and a step (C) of calcinating the granulated substance obtained in the step (B) in a non-oxidative gas and acidic gas atmosphere.

According to the present invention, it is possible to provide an electrode material enabling the obtainment of lithium ion batteries which are excellent in terms of cycle characteristics and input and output characteristics and capable of suppressing cell swelling and a method for manufacturing the electrode material.

DETAILED DESCRIPTION OF THE INVENTION

A most preferable form of an electrode material of the present invention and a method for manufacturing the electrode material will be described. Meanwhile, this form is specific description for the better understanding of the gist of the invention and, unless particularly otherwise described, does not limit the present invention.

Electrode Material

An electrode material of the present embodiment is an electrode material having an electrode active material and a pyrolytic carbonaceous electron-conducting film that coats the surface of the electrode active material, in which the amount of a surface acid of the electrode material, which is determined by a back-titration method using tetrabutylammonium hydroxide, is 1 μmol/m² or more and 5 μmol/m² or less per surface area of the electrode material.

The electrode active material that is used in the present embodiment is not particularly limited, but is preferably made of a transition metal lithium phosphate compound having an olivine structure and more preferably an electrode active material substance represented by General Formula of $Li_aA_xBO_4$ (here, A represents at least one element selected from the group consisting of Mn, Fe, Co, and Ni, B represents at least one element selected from the group consisting of P, Si, and S, and $0 \leq a < 4$ and $0 < x < 1.5$ are satisfied) from the viewpoint of a high discharge capacity, a high energy density, high safety, and excellent cycle characteristics.

Here, A is at least one element selected from the group consisting of Mn, Fe, Co, and Ni, and, among these, Mn and Fe are preferred, and Fe is more preferred.

B is at least one element selected from the group consisting of P, Si, and S, and, among these, P is preferred from the viewpoint of excellent safety and cycle characteristics.

a is 0 or more and less than 4, preferably 0.5 or more and 3 or less, more preferably 0.5 or more and 2 or less, and particularly preferably 1. x is more than 0 and less than 1.5, preferably 0.5 or more and 1 or less, and, among these, 1 is preferred.

The average primary particle diameter of the primary particles of the electrode active material is preferably 0.01 μm or more and 5 μm or less and more preferably 0.02 μm or more and 2 μm or less. When the average primary particle diameter is 0.01 μm or more, it is easy to uniformly coat the surfaces of the primary particles of the electrode active material with the pyrolytic carbonaceous electron-conducting film, and it is possible to substantially increase the discharge capacity in high-speed charging and discharging and to realize sufficient charge and discharge performance. On the other hand, when the average particle diameter is 5 μm or less, it is possible to decrease the internal resistance of the primary particles of the electrode active material and to increase the discharge capacity in the high-speed charging and discharging of lithium ion batteries.

Here, the average particle diameter refers to a number-average particle diameter. The average primary particle diameter of the primary particles of the electrode active material of the present embodiment can be obtained by randomly selecting 100 primary particles, measuring the long diameters and the short diameters of the respective primary particles using a scanning electron microscope (SEM), and obtaining an average value thereof.

The shape of the electrode active material is not particularly limited, but is preferably at least one selected from the group consisting of a spherical shape, a substantially spherical shape, a bale shape, a rice grain shape, a cylindrical shape, a substantially cylindrical shape, a cubic shape, and a substantially cubic shape, more preferably a spherical shape, and particularly preferably a truly spherical shape. When the shape of the electrode active material is a truly spherical shape, it is easy for the electrode material obtained by the formation of the secondary particles of the electrode active material to form spherical secondary particles.

Here, the reason for the shape of the electrode active material being preferably a spherical shape is that it is possible to decrease the amount of a solvent mixed to prepare an electrode material mixture by mixing the electrode material, a binder resin (binder), and the solvent, and the application of the electrode material mixture to an electrode current collector also becomes easy.

In addition, when the shape of the electrode active material is a spherical shape, the surface area of the electrode active material is minimized, and it is possible to minimize the blending amount of the binder resin (binder) being added to the electrode material mixture. As a result, it is possible to decrease the internal resistance of electrodes to be obtained.

Furthermore, when the shape of the electrode active material is a spherical shape, it becomes easy to closely pack the electrode material during the application of the electrode material mixture onto the electrode current collector, and thus the amount of the electrode material packed per unit volume increases. Therefore, it is possible to increase the electrode density, and consequently, the capacities of lithium ion batteries can be increased.

When the surface of the electrode active material is coated with the pyrolytic carbonaceous electron-conducting film, it is possible to impart favorable electron conductivity without significantly decreasing the densities of electrodes.

The thickness (average value) of the pyrolytic carbonaceous electron-conducting film that coats the electrode active material is preferably 0.5 nm or more and 10 nm or less and more preferably 0.7 nm or more and 5 nm or less. When the thickness of the pyrolytic carbonaceous electron-conducting film is 0.5 nm or more, it is possible to suppress the incapability of forming films having a desired resistance value due to an excessively thin thickness of the pyrolytic carbonaceous electron-conducting film. In addition, it is possible to ensure the conductivity as an electrode material.

On the other hand, when the thickness of the pyrolytic carbonaceous electron-conducting film is 10 nm or less, it is possible to suppress a decrease in the battery capacity per unit mass of the electrode material.

In addition, when the thickness of the pyrolytic carbonaceous electron-conducting film is 0.5 nm or more and 10 nm or less, it becomes easy to closely pack the electrode material, and thus the amount of the electrode material packed per unit volume increases. As a result, it is possible to increase the electrode density, and lithium ion batteries having a high capacity can be obtained.

In the electrode active material, 80% or more of the surfaces of the primary particles of the electrode active material are preferably coated with the pyrolytic carbonaceous electron-conducting film, and 90% or more of the surfaces of the primary particles are more preferably coated with the pyrolytic carbonaceous electron-conducting film. When the coating ratio of the pyrolytic carbonaceous electron-conducting film to the surfaces of the primary particles of the electrode active material is 80% or more, the coating effect of the pyrolytic carbonaceous electron-conducting film is sufficiently obtained. On the other hand, when the coating ratio of the pyrolytic carbonaceous electron-conducting film is less than 80%, a reaction resistance relating to the intercalation and deintercalation of Li ions increases in places in which the pyrolytic carbonaceous electron-conducting film is not formed when the intercalation and deintercalation reaction of Li ions is caused on the surface of the electrode material.

Meanwhile, the coating ratio of the pyrolytic carbonaceous electron-conducting film can be obtained by observing particles using a transmission electron microscope (TEM), an energy dispersive X-ray microanalyzer (EDX), or the like, calculating the proportion of portions that cover particle surfaces, and obtaining the average value thereof.

The density of the pyrolytic carbonaceous electron-conducting film, which is calculated from a carbon component that constitutes the pyrolytic carbonaceous electron-conducting film, is preferably 0.3 g/cm$^3$ or more and 1.5 g/cm$^3$ or less and more preferably 0.4 g/cm$^3$ or more and 1.0 g/cm$^3$ or less. The density of the pyrolytic carbonaceous electron-conducting film, which is calculated from a carbon component that constitutes the pyrolytic carbonaceous electron-conducting film, refers to the mass per unit volume of the pyrolytic carbonaceous electron-conducting film in a case in which the pyrolytic carbonaceous electron-conducting film is imagined to be constituted of carbon alone.

When the density of the pyrolytic carbonaceous electron-conducting film is 0.3 g/cm$^3$ or more, the pyrolytic carbonaceous electron-conducting film exhibits sufficient electron conductivity. On the other hand, when the density of the pyrolytic carbonaceous electron-conducting film is 1.5 g/cm$^3$ or less, the content of the fine crystals of graphite made of a lamellar structure in the pyrolytic carbonaceous electron-conducting film is small, and thus steric barriers by the fine crystals of graphite are not generated during the diffusion of Li ions in the pyrolytic carbonaceous electron-conducting film. Therefore, there is no case in which the charge migration resistance increases. As a result, there is no case in which the internal resistance of lithium ion batteries increases, and voltage drop does not occur at a high charge-discharge rate of lithium ion batteries.

The amount of carbon included in the electrode active material coated with the pyrolytic carbonaceous electron-conducting film is preferably 0.5% by mass or more and 10% by mass or less, more preferably 0.8% by mass or more and 3% by mass or less, and still more preferably 0.8% by mass or more and 2.5% by mass or less.

When the amount of carbon is 0.5% by mass or more, it is impossible to ensure conductivity as an electrode material, the discharge capacity increases at a high charge-discharge rate in a case in which lithium ion batteries have been formed, and sufficient charge and discharge rate performance can be realized. On the other hand, when the amount of carbon is 10% by mass or less, the amount of carbon does not excessively increase, and it is possible to suppress a decrease in battery capacities of lithium ion batteries per unit mass of the electrode material more than necessary.

The average secondary particle diameter of agglomerated particles formed by agglomerating a plurality of the primary particles of the electrode active material coated with the pyrolytic carbonaceous electron-conducting film is preferably 1 μm or more and 50 μm or less and more preferably 2 μm or more and 15 μm or less. When the average secondary particle diameter of the agglomerated particles is 1 μm or more, an increase in the viscosity of paste during application is suppressed, the coatability becomes favorable, and it is possible to suppress the occurrence of peeling by the lack of the binder. On the other hand, when the average secondary particle diameter of the agglomerated particles is 50 μm or less, seeding does not easily occur during the coating of electrodes, and it is possible to improve the coatability.

Here, the average secondary particle diameter refers to a volume-average particle diameter. The average secondary particle diameter of the agglomerated particles can be measured using a laser diffraction/scattering particle size distribution analyzer or the like.

The amount of a surface acid of the electrode material of the present embodiment, which is determined by a back-titration method using tetrabutylammonium hydroxide, is 1 μmol/m$^2$ or more and 5 μmol/m$^2$ or less and preferably 1.5 μmol/m$^2$ or more and 4 μmol/m$^2$ or less per surface area of the electrode material. When the amount of a surface acid of the electrode material is less than 1 μmol/m$^2$, it is not possible to sufficiently ensure the wettability with electrolytes, and thus the output is not sufficiently increased, and, in the case of solid electrolytes, the degradation of durability by peeling in interfaces also easily occur. On the other hand, when the amount of a surface acid exceeds 5 μmol/m$^2$, not only is the migration of Li ions in interfaces impaired, but an increasing amount of gas is also generated by the decomposition of a functional group.

In addition, when the amount of a surface acid of the electrode material is in the above-described range, the affinity between the electrode material and electrolytes improves, it is possible to decrease barriers to the intercalation and deintercalation of Li ions in the interface between the electrode material and electrolytes, and high input and output characteristics can be obtained. In addition, strong solid-solid interface bonds can be built, and thus, in the case of using a solid electrolyte, particularly, a polymer solid electrolyte, it is possible to suppress the breakage (peeling) of interfaces between the electrode material and solid electrolytes which is attributed to a change in volume by charging and discharging, and excellent cycle characteristics are exhibited. Therefore, it becomes possible to manufacture electrode plates for lithium ion batteries and lithium ion batteries from which stability or safety can be expected.

The amount of a surface acid of the electrode material can be calculated as described below. Tetrabutylammonium hydroxide of which the concentration is known is mixed with the electrode material so that the tetrabutylammonium hydroxide becomes excessive, the tetrabutylammonium hydroxide and the electrode material are reacted with each other, then, an excess amount of the tetrabutylammonium hydroxide is titrated (back-titrated) using perchloric acid, the amount of tetrabutylammonium hydroxide decreased is obtained, and the amount of a surface acid is calculated from the following equation.

Amount of surface acid($\mu$mol/m$^2$)=amount of acid in electrode material($\mu$mol)/surface area of electrode material(m$^2$)

Meanwhile, specifically, the amount of a surface acid of the electrode material can be obtained using a method described in examples.

The amount of a surface acid of the electrode material can be appropriately adjusted by introducing a functional group to the pyrolytic carbonaceous electron-conducting film that coats the surface of the electrode active material. As the functional group that is introduced to the pyrolytic carbonaceous electron-conducting film, an acidic functional group is exemplified. The acidic functional group is not particularly limited, and examples thereof include a sulfonic acid group, a phosphoric acid group, a carboxyl acid group, a maleic acid group, a maleic anhydride group, a fumaric acid group, an itaconic acid group, an acrylic acid group, a methacrylic acid group, and the like.

The specific surface area of the electrode material of the present embodiment obtained using a BET method is preferably 5 m$^2$/g or more and 40 m$^2$/g or less and more preferably 6 m$^2$/g or more and 25 m$^2$/g or less. When the specific surface area is 5 m$^2$/g or more, the Li ion diffusion resistance or the electron migration resistance inside the primary particles of the electrode material becomes small. Therefore, it is possible to decrease the internal resistance and to improve the output characteristics. On the other hand, when the specific surface area is 40 m$^2$/g or less, the specific surface area of the electrode material does not increase excessively, the mass of carbon that becomes necessary is suppressed, and it is possible to improve the battery capacities of lithium ion batteries per unit mass of the electrode material.

Meanwhile, the specific surface area can be measured by a BET method using a specific surface area meter (for example, manufactured by MicrotracBEL Corp., trade name: BELSORP-mini).

Method for Manufacturing Electrode Material

A method for manufacturing the electrode material according to the present embodiment has a step (A) of obtaining an electrode active material, a step (B) of mixing an organic compound that serves as the pyrolytic carbonaceous electron-conducting film source into the electrode active material obtained in the step (A) to obtain a granulated substance, and a step (C) of calcinating the granulated substance obtained in the step (B) in a non-oxidative gas and acidic gas atmosphere.

Step (A)

In the step (A), a method for manufacturing the electrode active material is not particularly limited, and, in a case in which the electrode active material is represented by General Formula of Li$_a$A$_x$BO$_4$ (here, A represents at least one element selected from the group consisting of Mn, Fe, Co, and Ni, B represents at least one element selected from the group consisting of P, Si, and S, and $0 \leq a < 4$ and $0 < x < 1.5$ are satisfied), it is possible to use a method of the related art such as a solid-phase method, a liquid-phase method, or a gas-phase method. Specifically, the active material can be obtained by hydrothermally synthesizing a slurry-form mixture prepared by mixing a Li source, an A source, a B source, and water using a pressure-resistant airtight container and cleaning the obtained precipitate with water.

As the reaction conditions of the hydrothermal synthesis, for example, the heating temperature is preferably 80° C. or higher and 250° C. or lower, more preferably 120° C. or higher and 220° C. or lower, and still more preferably 130° C. or higher and 200° C. or lower. In addition, the reaction time is preferably 30 minutes or longer and 48 hours or shorter and more preferably 1 hour or longer and 24 hours or shorter. Furthermore, the pressure during the reaction is preferably 0.1 MPa or more and 22 MPa or less and more preferably 0.1 MPa or more and 17 MPa or less.

Here, as the Li source, at least one selected from the group consisting of hydroxides such as lithium hydroxide (LiOH) and the like; inorganic lithium acid salts such as lithium carbonate (Li$_2$CO$_3$), lithium chloride (LiCl), lithium nitrate (LiNO$_3$), lithiumphosphate (Li$_3$PO$_4$), lithiumhydrogen phosphate (Li$_2$HPO$_4$), lithium dihydrogen phosphate (LiH$_2$PO$_4$), and the like; organic lithium acid salts such as lithium acetate (LiCH$_3$COO), lithium oxalate ((COOLi)$_2$), and the like; and hydrates thereof is preferably used.

Meanwhile, lithium phosphate (Li$_3$PO$_4$) can also be used as the Li source and the P source.

As the A source, chlorides, carboxylates, hydrosulfates, and the like which include at least one element selected from the group consisting of Mn, Fe, Co, and Ni are exemplified. For example, in a case in which the A source is Fe, as the Fe source, divalent iron salts such as iron (II) chloride (FeCl$_2$), iron (II) acetate (Fe(CH$_3$COO)$_2$), iron (II) sulfate (FeSO$_4$), and the like are exemplified, and at least one selected from the group consisting of iron (II) chloride, iron (II) acetate, and iron (II) sulfate is preferably used. In addition, in a case in which the A source is Mn, as the Mn source, at least one selected from the group consisting of manganese (II) chloride (MnCl$_2$), manganese (II) sulfate (MnSO$_4$), manganese (II) nitrate (Mn(NO$_3$)$_2$), manganese (II) acetate (Mn(CH$_3$COO)$_2$), and hydrates thereof is preferably used.

As the B source, compounds including at least one element selected from the group consisting of P, Si, and S are exemplified. For example, in a case in which the B source is P, as the P source, phosphoric acid compounds such as phosphoric acid (H$_3$PO$_4$) ammonium dihydrogen phosphate (NH$_4$H$_2$PO$_4$), diammonium phosphate ((NH$_4$)$_2$HPO$_4$), and the like are exemplified, and at least one selected from the group consisting of phosphoric acid, ammonium dihydrogen phosphate, and diammonium phosphate is preferably used.

Step (B)

In the step (B), first, the electrode active material obtained in the step (A) and an organic compound that serves as the pyrolytic carbonaceous electron-conducting film source are dispersed in a solvent, thereby preparing a homogeneous slurry. In the dispersion of the electrode active material and the organic compound in the solvent, it is also possible to add a dispersant.

As a method for dispersing the electrode active material and the organic compound in the solvent, for example, a method in which a medium stirring-type dispersion device that stirs medium particles at a high speed such as a planetary ball mill, an oscillation ball mill, a bead mill, a sand mill, a paint shaker, an attritor, or the like is used is preferred.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetylacetone, and cyclohexanone; amides such as dimethyl formamide, N,N-dimethylacetoacetamide, and N-methylpyrrolidone; glycols such as ethylene glycol, diethylene glycol, and propylene glycol; and the like. These solvents may be used singly, or two or more solvents may be used in mixture. Among these solvents, a preferred solvent is water.

The blending amount of the organic compound with respect to the electrode active material is preferably 0.5 parts by mass or more and 25 parts by mass or less and more preferably 1 part by mass or more and 20 parts by mass or less with respect to 100 parts by mass of the active material when the total mass of the organic compound is converted to a carbon element.

When the blending amount of the organic compound with respect to the electrode active material is 0.5 parts by mass or more, it is possible to set the amount of the pyrolytic carbonaceous electron-conducting film that is generated by a thermal treatment of the organic compound on the surface of the active material to 0.5% bymass or more. Therefore, it is possible to increase the discharge capacities of lithium ion batteries at a high charge-discharge rate and to realize sufficient charge and discharge rate performance. On the other hand, when the blending amount of the organic compound with respect to the electrode active material is 25 parts by mass or less, it is possible to suppress a relative decrease in the blending ratio of the active material and a consequent decrease in the capacities of lithium ion batteries. In addition, when the blending amount of the organic compound with respect to the electrode active material is 25 parts by mass or less, it is possible to suppress an increase in the bulk density of the electrode active material caused by the excess support of the pyrolytic carbonaceous electron-conducting film with respect to the electrode active material. Meanwhile, when the bulk density of the electrode active material increases, the electrode density decreases, and the battery capacities of lithium ion batteries per unit volume decrease.

As the organic compound, for example, at least one selected from the group consisting of polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid (PAA), polystyrene sulfonate,polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, polyvalent alcohols, and the like is preferably used.

Examples of the polyvalent alcohol include polyethylene glycol, polypropylene glycol, polyglycerin, glycerin, and the like.

The slurry is dried using a spray dryer and granulated, thereby obtaining a granulated substance. When the concentration of the slurry is appropriately adjusted during the drying of the slurry using a spray dryer, it is possible to adjust the average particle diameter of the secondary particles of the electrode active material coated with the pyrolytic carbonaceous electron-conducting film. The concentration of the slurry is preferably 2% to 65% by mass and more preferably 10% to 50% by mass. When the concentration of the slurry is set in the above-described range, it is possible to set the average particle diameter of the secondary particles of the electrode active material coated with the pyrolytic carbonaceous electron-conducting film in the above-described range.

Step (C)

In the step (C), the granulated substance obtained in the step (B) is calcinated in a non-oxidative gas and acidic gas atmosphere.

It is preferable that the calcination is carried out in a non-oxidative gas and acidic gas atmosphere at a temperature of preferably 600° C. or higher and 1,000° C. or lower and more preferably 700° C. or higher and 900° C. or lower for 0.1 hours or longer and 40 hours or shorter.

The non-oxidative gas atmosphere is preferably an atmosphere filled with an inert gas such as nitrogen ($N_2$), argon (Ar), or the like. In a case in which it is necessary to further suppress the oxidation of the mixture, a reducing atmosphere including approximately several percentages by volume of a reducing gas such as hydrogen ($H_2$) is preferred.

Examples of the acidic gas atmosphere include strong acidic gas atmospheres of a nitrogen oxide, carbon dioxide, or the like and weak acidic gas atmospheres of acetic acid or the like. Among them, weak acidic gas atmospheres are preferred.

A gas mixture of a non-oxidative gas and an acidic gas may also be used, but it is preferable to mix an acidic gas into a non-oxidative gas by simply bubbling a non-oxidative gas in an acidic aqueous solution.

When the kind and concentration of the acidic gas and the flow rate of the non-oxidative gas during the bubbling are appropriately adjusted, it is possible to set the amount of a surface acid of the electrode material to be obtained in the above-described range.

An electrode material made of an electrode active material coated with a pyrolytic carbonaceous electron-conducting film to which an acidic functional group is introduced can be obtained in the above-described manner.

Electrode

An electrode of the present embodiment is formed of the above-described electrode material.

In order to produce the electrode of the present embodiment, the above-described electrode material, a binder made of a binder resin, and a solvent are mixed together, thereby preparing paint for forming an electrode or paste for forming an electrode. At this time, a conductive auxiliary agent such as carbon black, acetylene black, graphite, ketjen black, natural graphite, artificial graphite, or the like maybe added thereto as necessary.

As the binder, that is, the binder resin, for example, a polytetrafluoroethylene (PTFE) resin, a polyvinylidene fluoride (PVdF) resin, fluorine rubber, or the like is preferably used.

The blending ratio between the electrode material and the binder resin is not particularly limited; however, for example, the content of the binder resin is set to 1 part by mass or more and 30 parts by mass or less and preferably set to 3 parts by mass or more and 20 parts by mass or less with respect to 100 parts by mass of the electrode material.

The solvent that is used for the paint for forming an electrode or the paste for forming an electrode may be appropriately selected in accordance with the properties of the binder resin.

Examples thereof include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and y-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methylpyrrolidone, glycols such as ethylene glycol, diethylene glycol, and propylene glycol, and the like. These solvents may be used singly, or a mixture of two or more solvents maybe used.

Next, the paint for forming an electrode or the paste for forming an electrode is applied onto one surface of a metallic foil and is then dried, thereby obtaining a metallic foil having a coated film made of a mixture of the electrode material and the binder resin formed on one surface.

Next, the coated film is pressed under pressure and dried, thereby producing a current collector (electrode) having an electrode material layer on one surface of the metallic foil.

In the above-described manner, direct current resistance is decreased, and it is possible to produce electrodes capable of increasing discharge capacities.

Lithium Ion Battery

A lithium ion battery of the present embodiment includes a cathode, an anode, and an electrolyte, and the cathode is made of the above-described electrode. Therefore, the affinity between the electrode material and the electrolyte improves, and the lithium ion battery has excellent cycle characteristics and excellent input and output characteristics and is capable of suppressing cell swelling. Therefore, the lithium ion battery of the present embodiment is preferably used as a power supply for mobile electronic devices such as mobile phones and notebook-type personal computers and also as a high-output power supply for electric vehicles, hybrid vehicles, and electric tools.

Examples of the anode include anodes including a carbon material such as metallic Li, natural graphite, artificial graphite, cokes, non-graphitizable carbon, hard carbon, or the like or an anode material such as a Li alloy, $Li_4Ti_5O_{12}$, $TiO_2$, Si, ($Li_{4.4}Si$), Sn, or the like.

The electrolyte is not particularly limited, but is preferably a non-aqueous electrolyte, and examples thereof include an electrolyte obtained by mixing ethylene carbonate (EC) and ethyl methyl carbonate (EMC) so that the volume ratio therebetween reaches 1:1, and dissolving lithium hexafluorophosphate ($LiPF_6$) in the obtained solvent mixture so that the concentration thereof reaches, for example, 1 mol/dm$^3$. In addition, $LiBF_4$ or $LiClO_4$ may be used instead of $LiPF_6$, and propylene carbonate or diethyl carbonate may be used instead of ethylene carbonate.

It is possible to make the cathode and the anode face each other through a separator. As the separator, it is possible to use, for example, a polyolefin-based material such as porous propylene, a cellulose-based material, a non-woven fabric, or the like.

In addition, instead of the non-aqueous electrolyte and the separator, a polymer solid electrolyte or an oxide-based or sulfide-based inorganic solid electrolyte may also be used.

EXAMPLES

Hereinafter, the present invention will be specifically described using examples and comparative examples. Meanwhile, the present invention is not limited to forms described in the examples.

Synthesis of electrode active material $Li_3PO_4$ as a Li source and a P source and $FeSO_4.7H_2O$ as a Fe source were used and mixed into pure water so that the substance amount ratio (Li:Fe:P) therebetween reached 3:1:1, thereby preparing a raw material slurry (mixture). The amount of Fe used was 30 mol, and the amount of $FeSO_4.7H_2O$ used was 8.34 kg.

Next, this mixture was stored in a pressure-resistant airtight container having a capacity of 2,000 L and hydrothermally synthesized at 210° C. for 16 hours. After this reaction, the mixture was cooled to room temperature (25° C.), thereby obtaining a precipitate.

Next, this precipitate was sufficiently cleaned a plurality of times with distilled water, and the water content ratio was maintained at 30% so as to prevent the precipitate from being dried, thereby producing a cake-form substance. As a result of measuring powder obtained by sampling a slight amount of the precipitate and drying the precipitate in a vacuum at 70° C. for two hours by means of X-ray diffraction, it was confirmed that single-phase $LiFePO_4$ was formed.

In addition, the BET specific surface area of the obtained specimen was 11 m$^2$/g. Similarly, specimens having different specific surface areas were synthesized by setting the reaction temperatures and the reaction times to 250° C. and 24 hours, 250° C. and 16 hours, 170° C. and 24 hours, 170° C. and 16 hours, and 150° C. and six hours. The BET specific surface areas of the obtained specimens were respectively 6.8 m$^2$/g, 8.8 m$^2$/g, 13.1 m$^2$/g, and 17.1 m$^2$/g.

Furthermore, some of $FeSO_4.7H_2O$ was changed to $MnSO_4.H_2O$, and a raw material having a substance amount ratio ($FeSO_4.7H_2O:MnSO_4.H_2O$) of 25:75 was used, thereby obtaining $Li[Fe_{0.25}Mn_{0.75}]PO_4$. The total substance amount of Fe and Mn was set to, similarly, 30 mol. The BET specific surface area of the obtained specimen was 16 m$^2$/g.

Instance 1: Example 1

Water was mixed into the obtained $LiFePO_4$ (specific surface area of 11 m$^2$/g) (30 g) and polyvinyl alcohol (1.3 g) as a carbon source so that the total amount reached 100 g, and the components were crushed and mixed using a ball mill together with zirconia balls (150 g) having 5 mm$\phi$, thereby obtaining a slurry.

The obtained slurry was dried using a spray dryer and granulated. After that, the obtained granulated substance was thermally treated in a nitrogen ($N_2$) and acetic acid gas atmosphere, thereby obtaining an electrode material of Example 1 made of an active material coated with a pyrolytic carbonaceous electron-conducting film. The acetic acid gas was added by bubbling a nitrogen gas into an acetic acid aqueous solution at a flow rate of 1 L/min. The temperature and time of the thermal treatment were respectively set to 780° C. and five hours.

Instance 1: Examples 2 to 4 and Comparative Examples 1 to 3

Electrode materials of Examples 2 to 4 and Comparative Examples 1 to 3 were obtained in the same manner as in Example 1 except for the fact that the polyvinyl alcohol was added in amounts of the carbon source added shown in Table 1, and the concentration of the acetic acid being bubbled was adjusted from 0% to 100%, thereby adjusting the amount of carbon and the amount of an acid on the surface.

Instance 2: Example 5

An electrode material of Example 5 was obtained in the same manner as in Example 1 except for the fact that LiFePO$_4$ having a specific surface area of 8.8 m$^2$/g was used instead of LiFePO$_4$ having a specific surface area of 11 m$^2$/g, and polyvinyl alcohol (1.4 g) was used as the carbon source.

Instance 2: Examples 6 to 8 and Comparative Example 4

Electrode materials of Examples 6 to 8 and Comparative Example 4 were obtained in the same manner as in Example 5 except for the fact that the polyvinyl alcohol was added in amounts of the carbon source added shown in Table 1, and the concentration of the acetic acid being bubbled was adjusted from 0% to 50%.

Instance 3: Example 9

An electrode material of Example 9 was obtained in the same manner as in Example 1 except for the fact that LiFePO$_4$ having a specific surface area of 13.1 m$^2$/g was used instead of LiFePO$_4$ having a specific surface area of 11 m$^2$/g, and polyvinyl alcohol (1.4 g) was used as the carbon source.

Instance 3: Examples 10 to 13 and Comparative Example 5

Electrode materials of Examples 10 to 13 and Comparative Example 5 were obtained in the same manner as in Example 9 except for the fact that the polyvinyl alcohol was added in amounts of the carbon source added shown in Table 1, and the concentration of the acetic acid being bubbled was adjusted from 0% to 30%.

Instance 4: Example 14

An electrode material of Example 14 was obtained in the same manner as in Example 1 except for the fact that LiFePO$_4$ having a specific surface area of 8.8 m$^2$/g was used instead of LiFePO$_4$ having a specific surface area of 11 m$^2$/g, and polyacrylic acid (1.2 g) was used as the carbon source instead of the polyvinyl alcohol.

Instance 4: Example 15

An electrode material of Example 15 was obtained in the same manner as in Example 14 except for the fact that the amount of the polyacrylic acid added was changed to 1.3 g.

Instance 5: Example 16

An electrode material of Example 16 was obtained in the same manner as in Example 1 except for the fact that LiFePO$_4$ having a specific surface area of 6.8 m$^2$/g was used instead of LiFePO$_4$ having a specific surface area of 11 m$^2$/g.

Instance 5: Comparative Example 6

An electrode material of Comparative Example 6 was obtained in the same manner as in Example 16 except for the fact that the concentration of the acetic acid being bubbled was changed to 0%.

Instance 5: Comparative Example 7

An electrode material of Comparative Example 7 was obtained in the same manner as in Example 16 except for the fact that the concentration of the acetic acid being bubbled was changed to 100%.

Instance 6: Example 17

An electrode material of Example 17 was obtained in the same manner as in Example 1 except for the fact that LiFePO$_4$ having a specific surface area of 17.1 m$^2$/g was used instead of LiFePO$_4$ having a specific surface area of 11 m$^2$/g, and lactose (1.4 g) was used as the carbon source instead of the polyvinyl alcohol.

Instance 6: Example 18

An electrode material of Example 18 was obtained in the same manner as in Example 17 except for the fact that the amount of the lactose added was changed to 1.5 g.

Instance 6: Comparative Example 8

An electrode material of Comparative Example 8 was obtained in the same manner as in Example 17 except for the fact that the concentration of the acetic acid being bubbled was changed to 0%.

Instance 7: Example 19

An electrode material of Example 19 was obtained in the same manner as in Example 1 except for the fact that Li[Fe$_{0.25}$Mn$_{0.75}$]PO$_4$ (29 g, specific surface area: 16 m$^2$/g) was used as the electrode active material instead of LiFePO$_4$ (30 g), a mixed solution of lithium carbonate, iron (II) acetate, and phosphoric acid (Li:Fe:P=1:1:1) which corresponded to LiFePO$_4$ (1 g) was used as the carbonization catalyst, and polyvinyl alcohol (1.5 g) was used as the carbon source.

Instance 7: Example 20

An electrode material of Example 20 was obtained in the same manner as in Example 19 except for the fact that the amount of the polyvinyl alcohol added was changed to 1.6 g.

Instance 7: Comparative Example 9

An electrode material of Comparative Example 9 was obtained in the same manner as in Example 19 except for the fact that the concentration of the acetic acid being bubbled was changed to 0%.

Instance 7: Comparative Example 10

An electrode material of Comparative Example 10 was obtained in the same manner as in Example 20 except for the fact that the concentration of the acetic acid being bubbled was changed to 100%.

The obtained electrode materials were evaluated using the following methods. The results are shown in Table 1.

1. Amount of Carbon

The amount of carbon (% by mass) in the electrode material was measured using a carbon analyzer (manufactured by Horiba Ltd., carbon/sulfur combustion analyzer EMIA-810W).

2. BET Specific Surface Area

The specific surface area of the electrode material was measured using a BET method by means of nitrogen (N$_2$) adsorption and a specific surface area meter (manufactured by MicrotracBEL Corp., trade name: BELSORP-mini).

3. Amount of Surface Acid

The electrode material (specimen) (2 g) and a $10^{-2}$ M methyl isobutyl ketone (MIBK) solution of tetrabutylammonium hydroxide (30 ml) were put into a triangular flask, the flask was tightly capped, and then the electrode material was ultrasonic-dispersed in an ultrasonic cleaner (manufactured by SND Co., Ltd., trade name: US-4) in which the tank temperature was controlled to 20° C. for one hour. A supernatant liquid (10 ml) obtained by centrifugally separating the electrode material from this dispersion was diluted with MIBK (100 ml) and titrated (back-titrated) using a $10^{-2}$ M perchloric acid solution, and the amount of tetrabutylammonium hydroxide that had reacted with an acidic functional group on the surface of the electrode material was obtained. The amount of a surface acid of the electrode material was calculated from this value using the following equation. Meanwhile, in the titration, an automatic titration device (manufactured by Hiranuma Sangyo Co., Ltd., trade name: COM-1700A) was used.

Amount of surface acid($\mu$mol/m$^2$)=amount of acid in specimen($\mu$mol)/surface area of specimen(m$^2$)

Production of Lithium Ion Batteries

The electrode material obtained in each of Examples 1 to 7, acetylene black (AB) as a conductive auxiliary agent, and polyvinylidene fluoride (PVdF) as a binder were mixed into N-methyl-2-pyrrolidone (NMP) so that the weight ratio (electrode material:AB:PVdF) therebetween reached 94:3:3, thereby producing cathode material paste. The obtained paste was applied and dried on a 30 μm-thick Al foil and pressed so as to obtain a predetermined density, thereby producing an electrode plate.

A 3×3 cm$^2$ plate-like specimen (cathode mixture-applied portion) was obtained from the obtained electrode plate by means of punching, thereby producing a test electrode. Meanwhile, metallic Li was employed as a counter electrode, and a porous polypropylene film was employed as a separator. In addition, a 1 mol/L lithium hexafluorophosphate (LiPF$_6$) solution was used as a non-aqueous electrolyte (a solution of a non-aqueous electrolyte). Meanwhile, as a solvent that was used in the LiPF$_6$ solution, a solvent obtained by mixing ethylene carbonate and ethyl methyl carbonate 1:1 in terms of % by volume was used.

In addition, laminate-type cells were produced using the test electrodes, the counter electrode, and the non-aqueous electrolyte produced in the above-described manner and were used as batteries for testing.

Evaluation of Lithium Ion Batteries

The obtained lithium ion batteries were evaluated using the following methods. The results are shown in Table 1.

4. Charge and Discharge Test (0.1 C Capacity and 4 C Capacity)

A charge and discharge test of the lithium ion batteries was repeatedly carried out three times at room temperature (25° C.) with a constant electric current of a charge-discharge rate of 0.1 C, and the discharge capacities at the third round was regarded as a 0.1 C capacities (initial discharge capacities). Next, the charge and discharge test was repeatedly carried out three times at room temperature (25° C.) with a constant electric current of a charge-discharge rate of 4 C, and the discharge capacities at the third round were regarded as 4 C capacities. Meanwhile, the cut-off voltage was set to 2.5 V to 4.1 V in examples and comparative examples in which LiFePO$_4$ was used as the electrode active material and set to 2.5 V to 4.4 V in examples and comparative examples in which Li [Fe$_{0.25}$Mn$_{0.75}$]PO$_4$ was used as the electrode active material.

5. Direct Current Resistance

The lithium ion batteries were charged with an electric current of 0.1 C at an ambient temperature of 0° C. for five hours, and the depths of charge were adjusted (state of charge (SOC) 50%). On the batteries adjusted to SOC 50%, "1 C charging for 10 seconds→10-minute rest→1 C discharging for 10 seconds→10-minute rest" as a first cycle, "3 C charging for 10 seconds→10-minute rest→3 C discharging for 10 seconds→10-minute rest" as a second cycle, "5 C charging for 10 seconds→10-minute rest→5 C discharging for 10 seconds→10-minute rest" as a third cycle, and "10 C charging for 10 seconds→10-minute rest→10 C discharging for 10 seconds→10-minute rest" as a fourth cycle were sequentially carried out. Voltages 10 seconds after the respective charging and discharging during the cycles were measured. Individual electric current values were plotted along the horizontal axis, and the voltages after 10 seconds were plotted along the vertical axis, thereby drawing approximate straight lines. The slopes of the approximate straight lines were respectively considered as direct current resistances during charging (charging DCR) and direct current resistances during discharging (discharging DCR).

6. Presence and Absence of Cell Swelling

The cell thicknesses were measured before and after the charge and discharge test and the direct current resistance test, and swelling (the amount of gas generated) was evaluated from the difference between the initial value and the thickness after the charge and discharge test using the following evaluation criteria.

A: The difference in the cell thickness was less than 2 mm.

B: The difference in the cell thickness was 2 mm or more and less than 3 mm.

C: The difference in the cell thickness was 3 mm or more.

TABLE 1

| Instance | | Composition of electrode active material | BET specific surface area (initial, m$^2$/g) | Carbon source | Amount of carbon source added [g] | Concentration of acidic gas being bubbled [%] | BET specific surface area [m$^2$/g] | Amount of carbon [% by mass] |
|---|---|---|---|---|---|---|---|---|
| 1 | Comparative Example 1 | LiFePO$_4$ | 11 | PVA | 1.3 | 0 | 9.1 | 0.91 |
| | Example 1 | LiFePO$_4$ | 11 | PVA | 1.3 | 10 | 9.9 | 1.00 |
| | Comparative Example 2 | LiFePO$_4$ | 11 | PVA | 1.4 | 0 | 10.0 | 1.16 |
| | Example 2 | LiFePO$_4$ | 11 | PVA | 1.4 | 10 | 10.7 | 1.23 |
| | Example 3 | LiFePO$_4$ | 11 | PVA | 1.5 | 10 | 10.8 | 1.32 |
| | Example 4 | LiFePO$_4$ | 11 | PVA | 1.4 | 50 | 10.3 | 1.22 |
| | Comparative Example 3 | LiFePO$_4$ | 11 | PVA | 1.5 | 100 | 10.9 | 1.24 |

TABLE 1-continued

| | | | | | | | | |
|---|---|---|---|---|---|---|---|---|
| Instance 2 | Comparative Example 4 | LiFePO$_4$ | 8.8 | PVA | 1.3 | 0 | 6.9 | 0.95 |
| | Example 5 | LiFePO$_4$ | 8.8 | PVA | 1.4 | 10 | 7.4 | 1.07 |
| | Example 6 | LiFePO$_4$ | 8.8 | PVA | 1.3 | 10 | 6.9 | 1.04 |
| | Example 7 | LiFePO$_4$ | 8.8 | PVA | 1.3 | 20 | 8.6 | 0.98 |
| | Example 8 | LiFePO$_4$ | 8.8 | PVA | 1.2 | 50 | 9.4 | 0.88 |
| Instance 3 | Comparative Example 5 | LiFePO$_4$ | 13.1 | PVA | 1.4 | 0 | 11.9 | 1.14 |
| | Example 9 | LiFePO$_4$ | 13.1 | PVA | 1.4 | 10 | 12.1 | 1.41 |
| | Example 10 | LiFePO$_4$ | 13.1 | PVA | 1.3 | 10 | 11.4 | 1.29 |
| | Example 11 | LiFePO$_4$ | 13.1 | PVA | 1.3 | 30 | 12.3 | 1.07 |
| | Example 12 | LiFePO$_4$ | 13.1 | PVA | 1.4 | 20 | 11.6 | 1.21 |
| | Example 13 | LiFePO$_4$ | 13.1 | PVA | 1.3 | 20 | 11.7 | 1.06 |
| Instance 4 | Example 14 | LiFePO$_4$ | 8.8 | PAA | 1.2 | 10 | 7.7 | 1.06 |
| | Example 15 | LiFePO$_4$ | 8.8 | PAA | 1.3 | 10 | 8.0 | 1.13 |
| Instance 5 | Comparative Example 6 | LiFePO$_4$ | 6.8 | PVA | 1.3 | 0 | 6.7 | 0.94 |
| | Example 16 | LiFePO$_4$ | 6.8 | PVA | 1.3 | 10 | 6.9 | 0.94 |
| | Comparative Example 7 | LiFePO$_4$ | 6.8 | PVA | 1.3 | 100 | 7.0 | 0.98 |
| Instance 6 | Comparative Example 8 | LiFePO$_4$ | 17.1 | Lactose | 1.4 | 0 | 15.4 | 1.08 |
| | Example 17 | LiFePO$_4$ | 17.1 | Lactose | 1.4 | 10 | 15.7 | 1.18 |
| | Example 18 | LiFePO$_4$ | 17.1 | Lactose | 1.5 | 10 | 16.2 | 1.32 |
| Instance 7 | Comparative Example 9 | Li[Fe$_{0.25}$Mn$_{0.75}$]PO$_4$ | 16 | PVA | 1.5 | 0 | 15.0 | 1.03 |
| | Example 19 | Li[Fe$_{0.25}$Mn$_{0.75}$]PO$_4$ | 16 | PVA | 1.5 | 10 | 15.0 | 1.03 |
| | Example 20 | Li[Fe$_{0.25}$Mn$_{0.75}$]PO$_4$ | 16 | PVA | 1.6 | 10 | 15.4 | 1.04 |
| | Comparative Example 10 | Li[Fe$_{0.25}$Mn$_{0.75}$]PO$_4$ | 16 | EVA | 1.6 | 100 | 15.4 | 1.09 |

| | | 0.1 C capacity [mAh/g] | 4 C capacity [mAh/g] | Direct current resistance [charging DCR/discharging DCR] [Ω] | Amount of acid [μmol/g] | Amount of surface acid [μmol/m$^2$] | Cell swelling |
|---|---|---|---|---|---|---|---|
| Instance 1 | Comparative Example 1 | 160 | 137 | 1.88/1.61 | 3 | 0.33 | A |
| | Example 1 | 160 | 147 | 1.72/1.51 | 29 | 2.92 | A |
| | Comparative Example 2 | 160 | 139 | 1.87/1.60 | 4 | 0.40 | A |
| | Example 2 | 159 | 142 | 1.72/1.52 | 28 | 2.63 | A |
| | Example 3 | 160 | 141 | 1.74/1.52 | 32 | 2.97 | A |
| | Example 4 | 158 | 140 | 1.80/1.57 | 44 | 4.26 | B |
| | Comparative Example 3 | 157 | 131 | 1.84/1.60 | 64 | 5.87 | C |
| Instance 2 | Comparative Example 4 | 159 | 130 | 2.39/1.92 | 2 | 0.29 | A |
| | Example 5 | 160 | 142 | 2.22/1.78 | 20 | 2.70 | A |
| | Example 6 | 161 | 140 | 2.01/1.77 | 24 | 3.45 | A |
| | Example 7 | 160 | 147 | 2.02/1.79 | 29 | 3.39 | A |
| | Example 8 | 157 | 144 | 2.22/1.79 | 41 | 4.39 | B |
| Instance 3 | Comparative Example 5 | 158 | 138 | 1.82/1.59 | 5 | 0.42 | A |
| | Example 9 | 157 | 138 | 1.80/1.59 | 28 | 2.32 | A |
| | Example 10 | 158 | 142 | 1.77/1.55 | 29 | 2.54 | A |
| | Example 11 | 157 | 139 | 1.79/1.59 | 30 | 2.44 | A |
| | Example 12 | 158 | 141 | 1.77/1.55 | 30 | 2.60 | A |
| | Example 13 | 158 | 136 | 1.79/1.58 | 32 | 2.73 | A |
| Instance 4 | Example 14 | 158 | 139 | 2.22/1.78 | 27 | 3.52 | A |
| | Example 15 | 161 | 142 | 2.21/1.78 | 27 | 3.37 | A |
| Instance 5 | Comparative Example 6 | 161 | 133 | 2.31/1.90 | 3 | 0.45 | A |
| | Example 16 | 160 | 136 | 2.22/1.83 | 27 | 3.94 | A |
| | Comparative Example 7 | 156 | 132 | 2.29/1.88 | 45 | 6.45 | C |
| Instance 6 | Comparative Example 8 | 157 | 135 | 1.72/1.51 | 5 | 0.32 | A |
| | Example 17 | 157 | 150 | 1.68/1.40 | 37 | 2.36 | A |
| | Example 18 | 156 | 149 | 1.68/1.42 | 33 | 2.04 | A |
| Instance 7 | Comparative Example 9 | 155 | 128 | 3.32/3.01 | 5 | 0.33 | A |
| | Example 19 | 156 | 135 | 2.65/2.42 | 31 | 2.07 | A |
| | Example 20 | 155 | 133 | 2.67/2.49 | 52 | 3.38 | B |
| | Comparative Example 10 | 150 | 110 | 4.02/3.87 | 88 | 5.71 | C |

PVA: Polyvinyl alcohol
PAA: Polyacrylic acid

In the electrode materials to which the acidic gas was introduced and in which the amount of a surface acid was 1 µmol/m² or more and 5 µmol/m² or less, high input and output characteristics and a decrease in the direct current resistance were confirmed. On the other hand, in cases in which the acidic gas was not used, the amount of a surface acid was small, the direct current resistance increased, and the input and output characteristics were also not sufficient. In addition, in the electrode materials to which the acidic gas was excessively introduced and in which the amount of a surface acid exceeded 5 µmol/m², a significant increase in the direct current resistance and the degradation of the input and output characteristics were observed, furthermore, a large amount of gas was generated, and clear swelling was observed in the cells after the tests.

What is claimed is:

1. An electrode material comprising:
   an electrode active material; and
   a pyrolytic carbonaceous electron-conducting film that coats a surface of the electrode active material,
   wherein the pyrolytic carbonaceous electron-conducting film has at least one acidic functional group selected from the group consisting of a sulfonic acid group, a phosphoric acid group, a carboxyl acid group, a maleic acid group, a maleic anhydride group, a fumaric acid group, an itaconic acid group, an acrylic acid group, and a methacrylic acid group,
   wherein an amount of a surface acid of the electrode material, which is determined by a back-titration method using tetrabutylammonium hydroxide, is 1 µmol/m² or more and 5 µmol/m² or less per surface area of the electrode material,
   wherein the electrode active material is an electrode active material substance represented by General Formula of $Li_aA_xBO_4$ in which A represents at least one element selected from the group consisting of Mn, Fe, Co, and Ni, B represents at least one element selected from the group consisting of P, Si, and S, and $0 \leq a < 4$ and $0 < x < 1.5$ are satisfied, and
   wherein a specific surface area of the electrode material found by a BET method is 5 m²/g or more and 17.1 m²/g or less.

2. A method for manufacturing the electrode material according to claim 1, the method comprising:
   obtaining an electrode active material;
   mixing an organic compound that serves as a pyrolytic carbonaceous electron-conducting film source into the electrode active material obtained in the obtaining to obtain a granulated substance; and
   calcinating the granulated substance obtained in the mixing in a non-oxidative gas and acidic gas atmosphere.

3. The electrode material according to claim 1, wherein an amount of a surface acid of the electrode material, which is determined by a back-titration method using tetrabutylammonium hydroxide, is 2.04 µmol/m² or more and 4.39 µmol/m² or less per surface area of the electrode material.

4. The electrode material according to claim 1, wherein in the electrode active material, 80% or more of the surface of primary particles of the electrode active material are coated with the pyrolytic carbonaceous electron-conducting film.

* * * * *